United States Patent [19]

Smith, 2nd

[11] 4,184,158
[45] Jan. 15, 1980

[54] TIME SHARED OPERATION OF NAVIGATIONAL UNIT

[75] Inventor: Frank P. Smith, 2nd, Dresher, Pa.

[73] Assignee: Narco Scientific, Inc., Fort Washington, Pa.

[21] Appl. No.: 876,095

[22] Filed: Feb. 8, 1978

[51] Int. Cl.$^2$ ............................................. G01S 1/14
[52] U.S. Cl. .......................... 343/108 R; 343/106 R; 343/109
[58] Field of Search ................ 343/106 R, 108 R, 109

[56] References Cited
U.S. PATENT DOCUMENTS

| | | | |
|---|---|---|---|
| 3,386,096 | 5/1968 | Lundgreen et al. | 343/106 R |
| 3,810,181 | 5/1974 | Tierney et al. | 343/108 R |
| 4,025,923 | 5/1977 | Ferrara et al. | 343/106 R |

Primary Examiner—Maynard R. Wilbur
Assistant Examiner—Richard E. Berger
Attorney, Agent, or Firm—Paul & Paul

[57] ABSTRACT

A general aviation navigational receiver is provided with a digital channel selection wherein a channel selection knob on the aircraft control board may be operated to control the functioning of a digitally implemented frequency synthesizer which in turn controls the operation of a voltage controlled oscillator for providing frequency signals to an RF mixer of the unit, the frequency synthesizer being programmed for both possible VOR/LOC and GS channel frequencies wherein switching between frequencies is accomplished in synchronism with the basic clock within the synthesizer greatly reducing transient changeover time.

13 Claims, 4 Drawing Figures

4,184,158

TIME SHARED OPERATION OF NAVIGATIONAL UNIT

BACKGROUND OF THE INVENTION

Navigational systems for use in aircraft and other means of travel have included transmission and receiver devices for handling radio and radar information, which information is used to develop the basic data needed to nagigate. This data includes direction of travel, distance to or from fixed reference points, and the measurement of azimuth. The present invention relates to navigational receivers in general, and in particular, to an avionics system for receiving a plurality of signals such as OMNI mode VOR signals, ILS localizing signal (LOC) and ILS glide slope signals (GS) wherein a single frequency synthesizer may be utilized for controlling the operation of a voltage controlled oscillator for providing mixing frequencies to the radio frequency mixers of the receiver. Such a frequency synthesizer would be required to handle a large number of channel frequencies and quickly switch between channels.

Prior receivers, such as the circuit disclosed by Lundgreen, et al, U.S. Pat. No. 3,386,096 and Ferrara, U.S. Pat. No. 4,025,923 have employed separate frequency synthesizers or driving voltage controlled oscillators (VCO) for supplying frequencies to each RF mixer within the navigational receiver. These circuits have incorporated specific individual components for processing each specific type of signal. Prior receivers which were required to handle both VOR/LOC and GS information have included a duplication of similar circuits for processing each of the various types of signals.

In a navigational receiver for handling VOR/LOC information and GS information on a time-shared, multiplex operational basis wherein many of the components including the frequency synthesizer and voltage controlled oscillator have a dual dedication, i.e., are switched between one processing function and its attending frequencies and another processing function at other frequencies, it is desirable to have a chemical frequency selection scheme which can be easily reconfigured and can be switched quickly between one operating frequency and another.

An object of this invention is to provide a digital channel selection scheme for a general aviation navigational receiver.

A second object of this invention is to provide such a navigational receiver with a digital frequency synthesizer connected to the channel selection switches of this unit for controlling the operation of an associated voltage controlled oscillator for providing mixer frequencies.

Another object of this invention is to provide such a frequency synthesizer preprogrammed to each of the frequencies needed for each of the channels to be selected by the operation of the unit and capable of multiplex operation for alternately switching the associated VCO between LOC mixer frequencies and GS mixer frequencies.

A further object of this invention is to provide for such a channel selection and switching between frequencies in synchronism with a basic clock resident within the frequency synthesizer to minimize loss of information.

SUMMARY OF THE INVENTION

The objects of this invention may be achieved in a navigational receiver having a digital frequency synthesizer controlling the operation of a voltage controlled oscillator for providing frequencies to RF mixer components.

This synthesizer may be operated in a time-shared frequency change mode requiring the sequential generation of two or more different frequencies.

Megahertz and kilohertz selection may be made directly from a frequency select switch with interconnected digital code converter and buffer. A divide-by "N" counter may be driven by the digital output from the code converter and buffer while analog stored historical information may be utilized to reduce the time required for the synthesizer to output the correct frequency.

A change in synthesizer dedication is caused to occur near the end of the divide by "N" operation whereby the multiplex timing periods are tied to the divide by "N" operation of the frequency synthesizer.

DESCRIPTION OF THE DRAWINGS

The advantages, features and operation of the invention can easily be understood from a reading of the following detailed description of the invention in conjunction with the attached drawings wherein like numerals refer to like elements and in which.

DETAILED DESCRIPTION

A navigational receiver has a digital channel selection scheme which is implemented by a digitally operating frequency synthesizer located therein for controlling L.O. frequencies applied to an RF mixer in the front end of the unit. This digitally operated frequency synthesizer may be incorporated into a VOR receiver or an ILS, glide slope receiver or an ILS localizer receiver or an ILS LOC multiplexed receiver for alternately processing LOC (lateral) and GS (vertical) navigation information.

Figure 1:
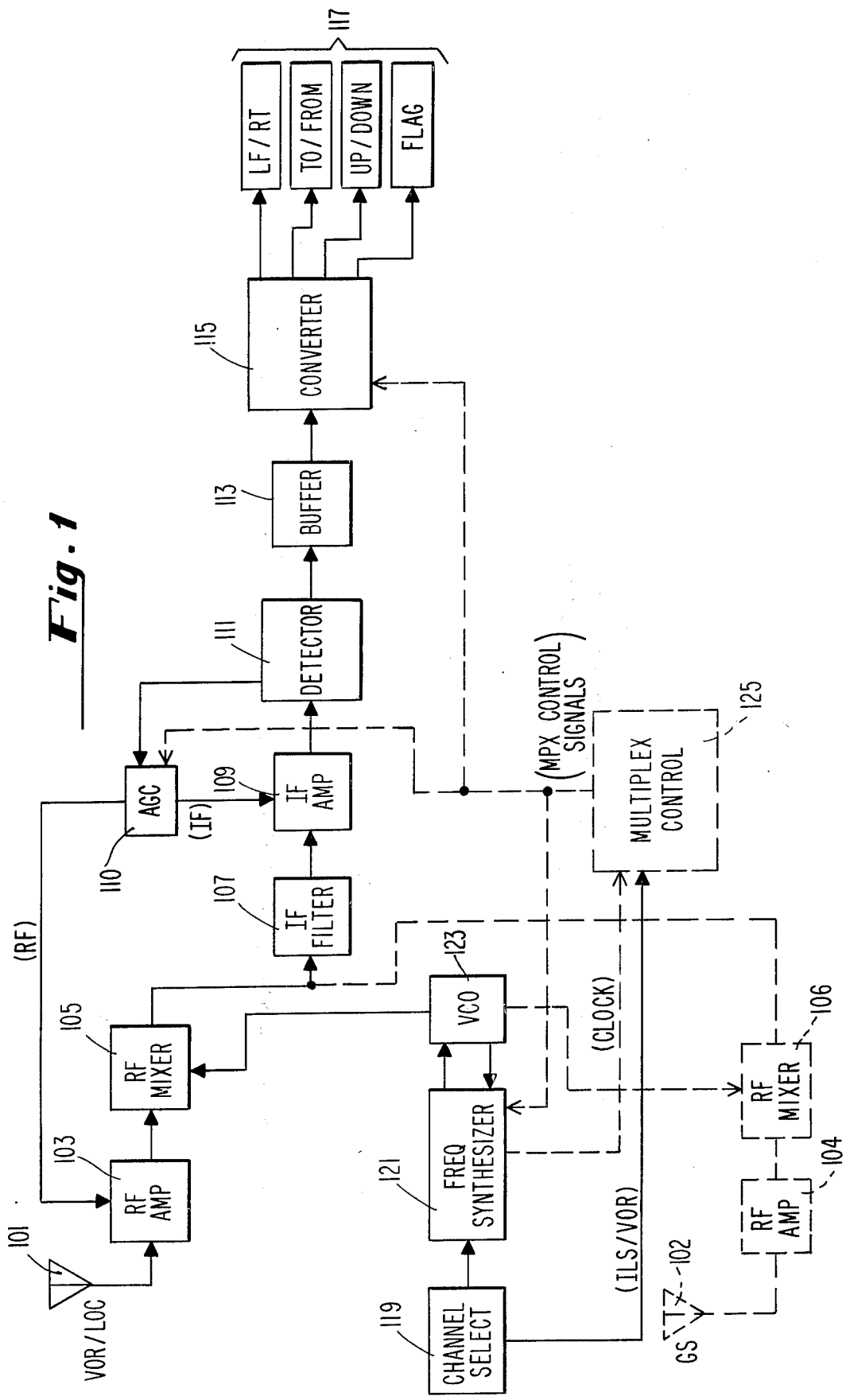
FIG. 1 is a block diagram of a navigational receiver containing the frequency synthesizer of the invention.

A typical navigational receiver constituting the environment for the digitally operating frequency synthesizer of the invention is shown in FIG. 1. An antenna 101 receives the radio information from a ground station and is directly connected to an RF amplifier 103. The output of the amplifier 103 is connected to an RF mixer 105 which feeds an IF filter 107. Signals are passed through the filter 107 to an IF amplifier 109 and then to a detector 111. The signals exiting the detector 111 enter a buffer 113 which sends them on to a converter 115 for driving a display 117 located on the control board of the aircraft. An automatic gain control component 110 (AGC) is connected in an IF feedback loop from phase detector 111 to IF amplifier 109 and in an RF feedback loop from phase detector 111 to RF amplifier 103.

A channel select 119 is connected to control the operation of a frequency synthesizer 121 containing, normally, a 3.2MHz crystal oscillator. Frequency synthesizer 121 provides a control voltage to a voltage controlled oscillator 123 (VCO) which provides L.O. frequency signals to the RF mixer 105.

The antenna 101 may be tuned to receive either LOC information or GS information. With the antenna 101 constructed to receive LOC information, RF mixer 105 received injection frequencies from VCO 123 correlated to the received LOC signals. The basic unit may be converted to time-shared, multiplexed operation for the processing of GS signals in addition to LOC signals by the addition of certain components. The multiplexed configuration may be established wherein the IF filter 107, the IF amplifier 109, the phase detector 111, AGC feedback 110 and the buffer 113, may be utilized to process both LOC and GS signals. As an example, a second GS antenna 102 and a second RF amplifier 104 and RF mixer 106 connected thereto GS frequency signals may be connected in common with the LOC antenna 101, its RF amplifier 103 and its RF mixer 105 at the input of the IF filter 107. When functioning in the multiplexed mode, the VCO 123 will also provide L.O. frequency signals to the GS RF mixer 106. By controlling the output frequency of the VCO 123 for a range either for LOC signal processing or for GS signal processing, and by simultaneously enabling or inhibiting operation of the LOC RF amplifier 103 and RF mixer 105 or the GS RF amplifier 104 and mixer 106, multiplexed signals are sent to the IF filter 107. Controlling VCO 123 operation to alternately provide LOC frequencies and GS frequencies is accomplished by the frequency synthesizer 121.

The converter 115 is enhanced to handle both LOC and GS signals and to demultiplex these signals into four distinct output signals to the display 117. Display 117 is capable of displaying "left/right" VOR/LOC information "to/from" VOR/LOC information, "up/down" and "unsafe" (flag) GS information.

A multiplex control circuit 125 is needed to coordinate the operation of the various components. This multiplex control circuit 125 may be driven by basic clock pulses from the frequency synthesizer 121 and may generate multiplex control signals to control the dual operation of AGC 110 control signals to the frequency synthesizer 121. The multiplex control circuit 125 may also supply demultiplex control signals to the enhanced converter 115.

Figure 2:
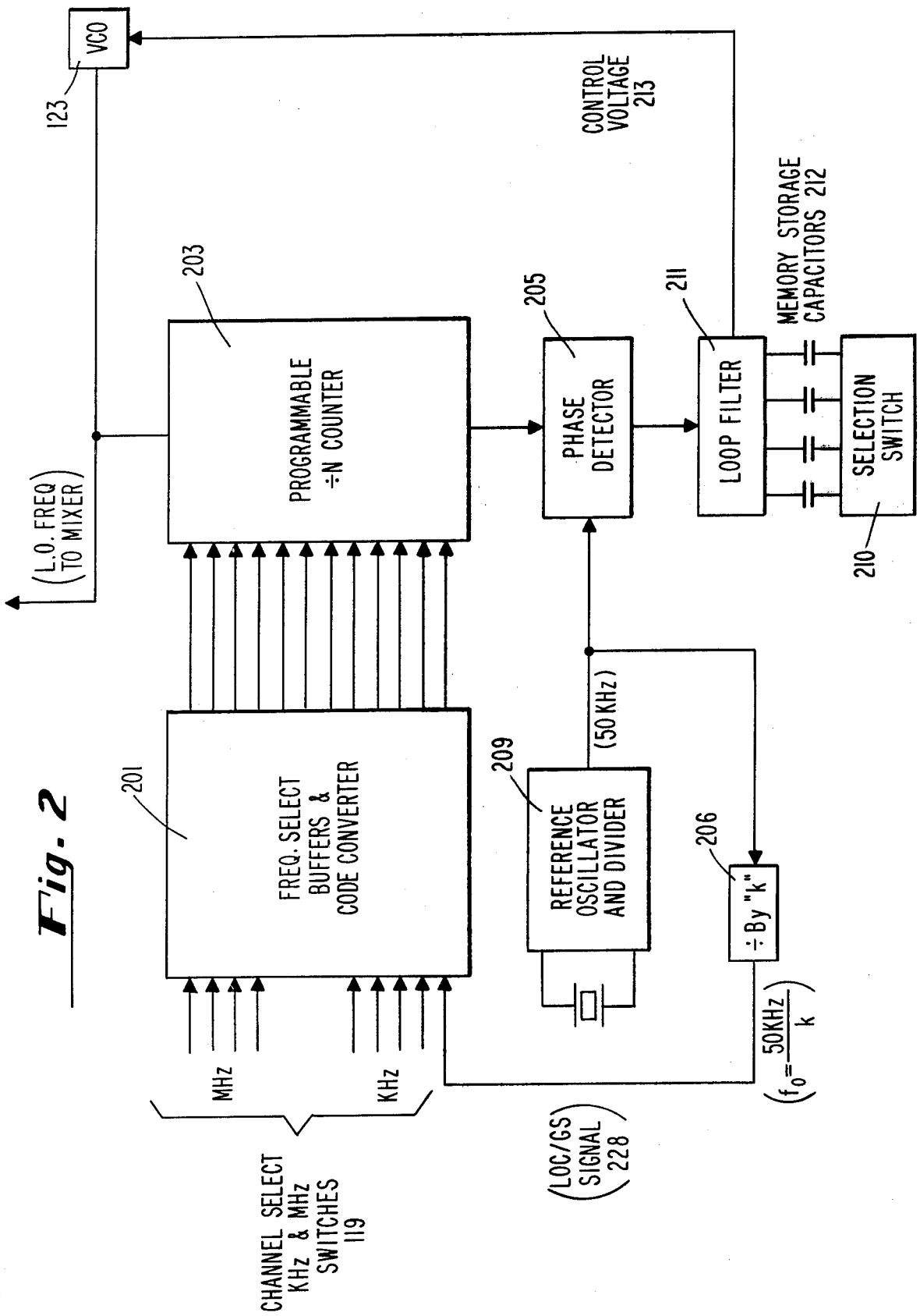
FIG. 2 is a block diagram showing the principle components of the digital frequency synthesizer of the invention.

Whether constructed for multiplex operation or not, the digital frequency synthesizer 121 contains certain basic components, FIG. 2. Frequency select switch, decoder and buffers circuit 201 receives megahertz and kilohertz operating status input from channel select kilohertz and megahertz switches 119 and provides the frequency "instruction." The output from the frequency select switch, code converter and buffers circuit 201 is connected to drive a programmable divide-by-"N" counter 203. Programmable divide-by-N counter 203 also receives an RF feedback input (L O. frequency) from VCO 123. The output of the programmable counter 203 is connected to a phase detector 205 which also receives a 50KHz signal 207 from a reference oscillator 209. The output of the phase detector 205 is connected through a loop filter 211, which also receives a multiplex control signal from the frequency instruction circuit 201, to provide a control voltage 213 to VCO 123. Loop filter 211 has associated with it multiplex memory storage capacitors 212 which hold historical information of what voltage is required, each loop filter capacitor being duplicated for each frequency mode being multiplexed.

The 50KHz signal 207 from reference oscillator 209 is also connected to a divide by k frequency divider 206 which develops the multiplex control signal 228 input to the frequency instruction circuit 201. This control signal 228 is in synchronism with the basic 50KHz signal 207, being derived therefrom, which 50KHz signal 207 is also fed to clock the programmable counter 203.

A phase locked loop is therefore established for the operation of VCO 123, frequency instruction circuit 201 and programmable divide-by-N counter 203, being each tied in synchronism to a derived signal from the reference frequency oscillator 209. The instruction from frequency select switch buffers and code converter 201 is designed to occur just before that input is preset into the divide-by-N counter 203.

Optimum system performance is obtained by minimizing the time required to change from one predetermined frequency (F1) to another freqency (F2). This is obtained by making the "frequency change" command synchronous with the reference frequency utilized by the divide-by-N synthesizer 121. Moreover, proper polarity/time relationship is also required.

The "settling time" required of a divide-by-N synthesizer 121 is minimized by causing the programming word change to occur just before this word is loaded into the divide-by-N counter 203 by a next preset pulse.

With the loop filter capacitor 212 voltages applied, which were retained from the last time the new frequency (F2) was received, the time between a frequency change command (time share) and the time when the receiver is actually receiving the new frequency (F2) can be very short. Leakage of the loop filter capacitor voltage (used for F2), during the time the system is not supplying this capacitor, and other non-switch capacitances act to limit the system settling time to less than one millisecond.

Without the proper synchronous relationship stated above, the settling time can exceed five milliseconds. The wrong frequency information would be applied to the phase detector 205 for the duration of the first divide-by-N output period, as long as 20 microseConds. The system must then run many such periods (as many as 250) to reduce this gross error to an acceptable level.

While the instruction word to the programmable divide-by-N counter 203 can be in any of a plurality of formats, the preferred embodiment and ARINC code control word (2 out of 5).

Figure 3A:
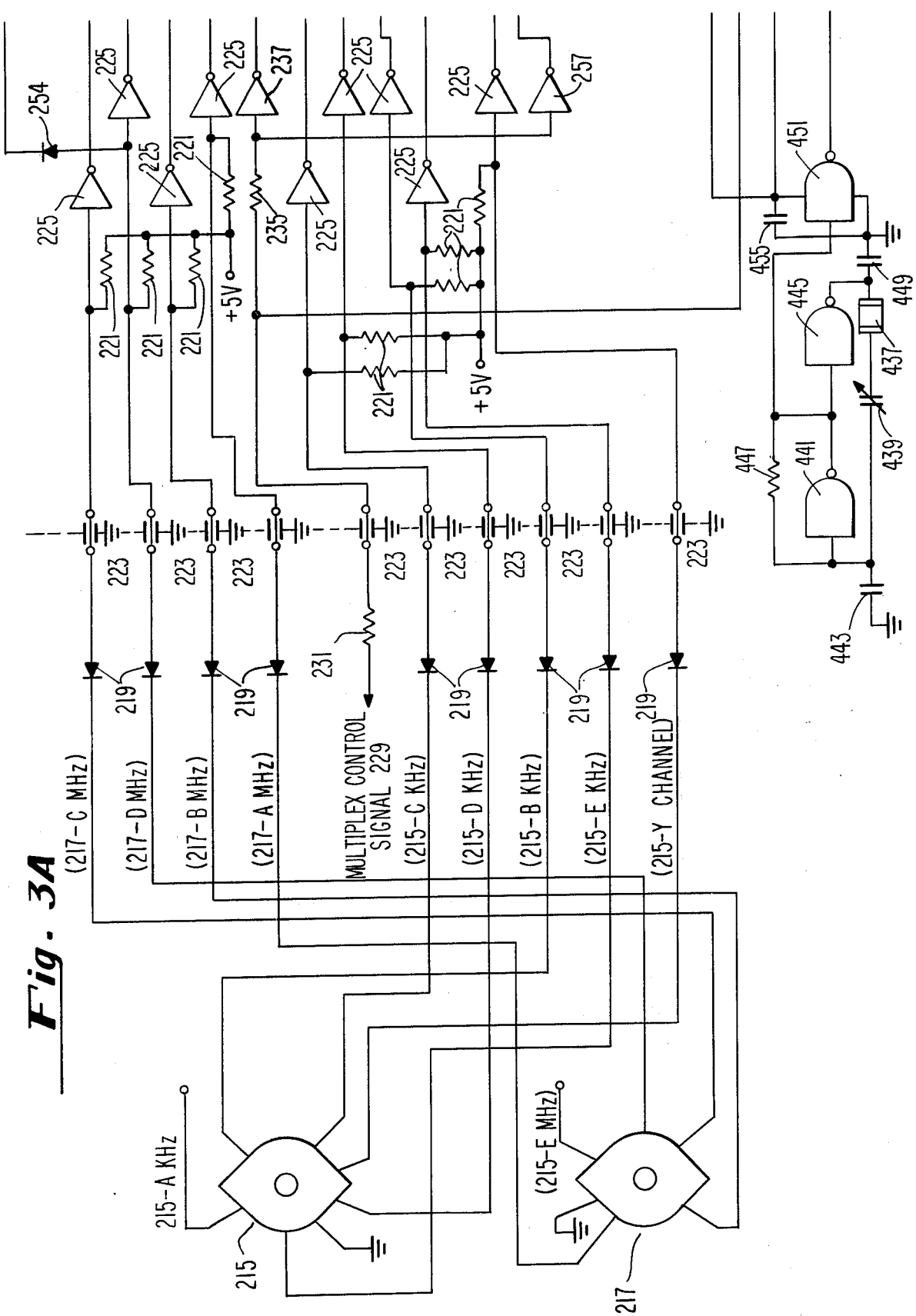
FIGS. 3A and 3B show detailed circuit diagrams of the synthesizer of FIG. 2 and its interconnection to frequency selection switches.
Figure 3B:
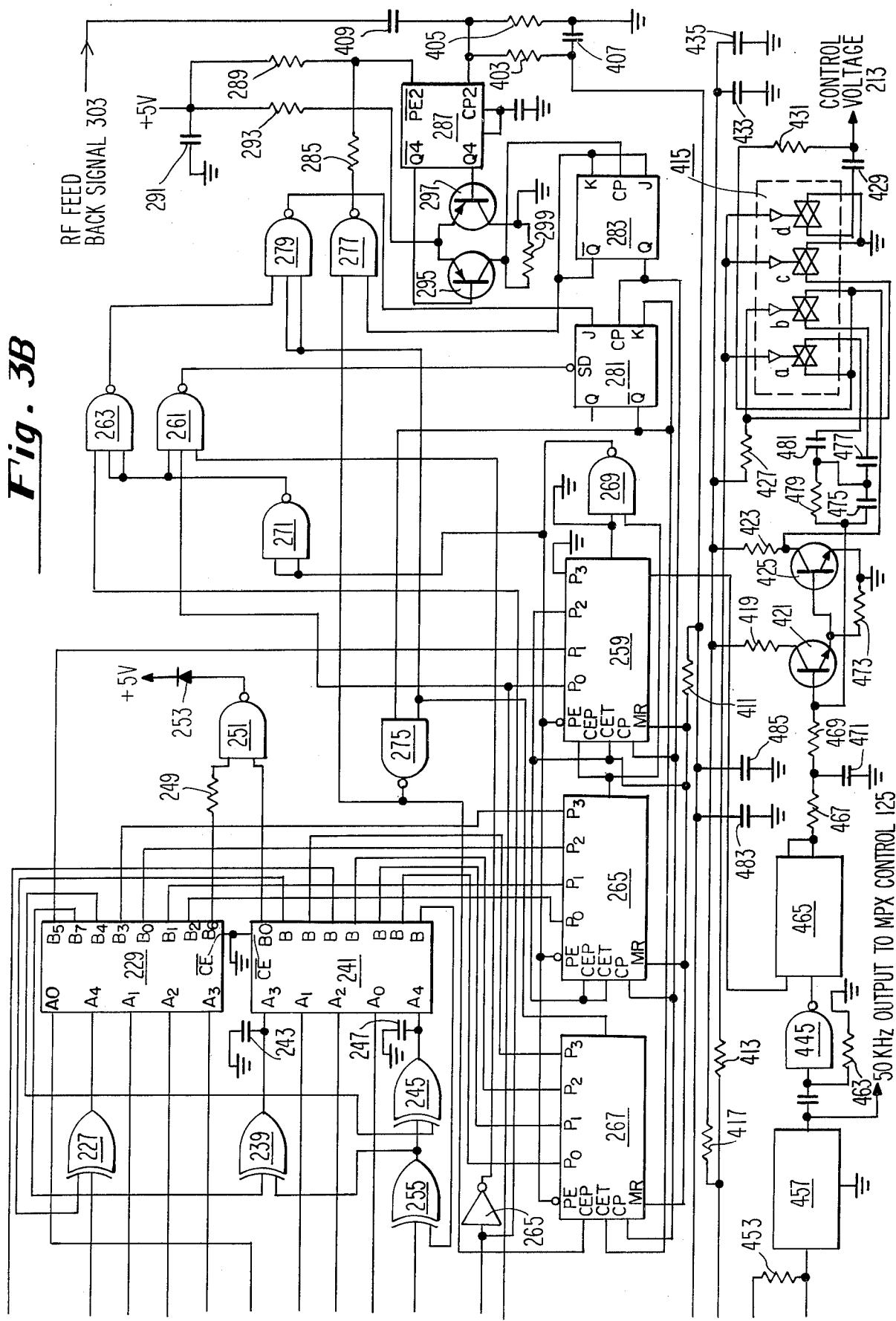

The channel select 119 is implemented by two rotatable wafer switches 215 and 217, FIGS. 3A and 3B. A frequency selection code conversion occurs which utilizes these two switches 215 and 217 located on the aircraft control board.

To set up the correct frequency division for obtaining 50KHz at the input of the phase detector 205, frequency select switches 215 and 217 provide the standard two out of five ARINC code word to control the frequency of the synthesizer 121 wherein the switch 215 is utilized for kilohertz frequency selection and the switch 217 is utilized for megahertz frequency selection.

The megahertz selector switch 217 provides five lines of digital information, 217-A through 217-E. For each megahertz frequency selected two out of five lines (A through E) are activated; in this case the lines are grounded. Megahertz switch 217 is a single wafer, ten positioned switch. Only four output lines (A, B, C, and D) are required by the synthesizer 121 to encode ten different megahertz frequencies.

the kiloHertz selector switch 215 provides six lines of digital information. The switch 215 is implemented by a twenty position double-sided wafer switch. One side of the wafer 215 provides a standard two out of five ARINC code word for two positioned groups (1–2, 3–4, etc.); the other side provides the single code for the "Y" channel, 50KHz channel programming. It should be noted that for each kilohertz position of the switch 215, the "Y" output has two conditions (1 and 0) for 50KHz increments.

As with the megahertz switch 217, the kilohertz switch 215 information is transferred to the synthesizer 121 on four lines (215-B, 215-C, 215-D and 215-E) the "Y" line is an additional line for 50KHz information.

Diode isolation and pull up resisters are connected to the output lines of the switch 215, lines B, C, D, E, and Y, and to the switch 217, lines A, B, C, and D. Specifically, an identical diode 219, is connected in series with each of the output lines from the switches 215 and 217 with the cathode of these diodes 219 connected directly to the switch. A plurality of idEntical 4.7K Ohm resisters 221 are connected, on each, between the anode of each of the diodes 219 and a plus 5 volt supply. A plurality of 0.001 microfarad capacitors 223 are connected, one each, to shunt noise on the transmission line between the anode of a diode 219 and the remainder of the synthesizer 121 circuitry to ground. A plurality of inverter/drivers 225 are connected, one each, to the output of each of the nine lines coming from the switches 215 and 217.

The output of the "C" megahertz signal line (217-C) inverter/driver 224 is connected to one input of an exclusive OR 227. The output of this first exclusive OR 227 is connected to the $A_4$ input of a first programmable read-only memory (PROM) 229. The output of the switch 217-D megahertz converter/driver 225 is connected to the $A_1$ input of the PROM 229. The output of the switch 217-B megahertz inveRTEr/driver 225 output is connected to the $A_2$ input of the PROM 229, while the output of the switch 217-A megahertz inverter/driver 225 is connected to the $A_3$ input of this PROM 229.

Multiplex control signal 228 from the multiplex control unit 125 is connected in series with a 220 Ohm resistor 231; the transmission line therefrom includes a 0.001 microfarad capacitor 233 to ground. A 33K Ohm capacitor 235 is connected between the resistor 231 and an input to an inverter/driver 237; the driver 237 being of a type identical to the drivers 225. The output of the driver 237 is connected to the $A_0$ input of the PROM 229.

The $B_7$ output of the PROM 229 is connected to one input of a seconD exclusive OR 239. The output of this second exclusive OR 239 is connected to the $A_3$ input of a second programmable read-only memory 241. The $A_3$ input of this second PROM 241 is also tied to ground through a 0.001 microfarad capacitor 243. The $B_4$ output of the first PROM 229 is connected to an input of a third exclusive OR 245. This third exclusive OR 245 has its output connected to the $A_4$ input of the second PROM 241, the output line of this third exclusive OR also having a 0.001 microfarad capacitor 247 to ground.

The $B_6$ output of the first PROM 229 is connected through a 180 Ohm resistor 249 to a first input of a first NAND gate 251. The other input of this NAND gate 251 is connected to the $B_0$ output of the second PROM 241. The output of this NAND gate 251 provides a plus five volts reference for the rest of the circuit via a series connection through a diode 253; the diode 253 being connected with its anode adjacent to the output of the NAND gate 251. The $B_5$ output of the PROM 241 is connected to the other input of the first exclusive OR 227. The $B_6$ output of the second PROM 241 is connected through a diode 254 to the input of the switch 217-D megahertz inverter/driver 225. The anode of the diode 255 being adjacent to the input of the driver 225.

The output of the switch 215-C kilohertz signal inverter/driver 225 is connected to the $A_1$ input of the second PROM 241, while the output of the switch 215-D kilohertz inverter/driver 225 is connected to the $A_2$ input of this PROM 241. The output of the switch 215-B kilohertz signal inverter/driver 225 is connected to the $A_0$ input of the second PROM 241, while the output of the switch 215-E kilohertz output inverter/driver 225 is connected to an input of a fourth exclusive OR 255. The output of this fourth exclusive OR 255 is connected to a second input of the third exclusive OR 245 and a second input of the second exclusive OR 239. The $B_7$ output of the second PROM 241 is connected to the second input of the fourth exclusive OR 255. The first and second PROMs 229 and 241 have their $\overline{CE}$ outputs connected in common to ground.

Multiplex control signal 228, inverter/driver 239, has its input connected in common with the input to another inverter/driver 257. This inverter/driver 257 has its output connected to the $P_0$ input of a first counter segment 259 as well as to one input of a second NAND gate 261. The output of the switch 215-"Y" signal inverter/driver 225 is connected to an input to a third NAND gate 263 and in common to an input to another inverter/driver 265. The output of the latter inverter/driver 265 is connected to another input of the second NAND gate 261.

First counter segment 259 has its $P_1$ input connected to the $B_5$ output of the first PROM 229 and its $P_3$ input connected to ground. The $B_3$ output of the first PROM 229 is connected to the $P_3$ input of a second counter segment 265. The $B_0$ output of the first PROM 229 is connected to the $P_2$ input of the second counter segment 265 while the $B_1$ input of the counter 265. The PROM 229 has its $B_2$ output connected to the $P_0$ input of the second counter segment 265. *

The second PROM 241 has its $B_1$ output connected to the $P_2$ input of a third counter segment 267 and the $B_2$ output of the PROM 241 connected to the $P_1$ input of the third counter segment 267. The $B_3$ output of the PROM 241 is connected to the $P_0$ input of the third counter segment 267. The first, second and third counter segments 259, 265, and 267 have their PE inputs connected in coMmon to the output of a fourth NAND gate 269. The output of the NAND gate 269 also being tied to the inputs of a fifth NAND gate 271, wherein fifth NAND gate 271 has its output connected to an input of the second NAND gate 261 and to inputs to the third NAND gate 263.

Fourth NAND gate 269 has one of its inputs connected to the TC output of the first counter segment 259. This input to the fourth NAND gate 269 is also connected to ground through a 100 picofarad capacitor 273. A second input to the fourth NAND gate 269 is connected to the TC output of the second counter segment 265 which in turn is also connected to the CEP input of the first counter segment 259.

Third counter segment 267 has its MR output connected to the MR output of the second counter segment 265 and to the MR output of the first counter segment 259. These MR outputs are also connected to the CET input of the first counter segment 259 as well as the CEP and CET input of the second input counter segment 265 and the P₂ input of the first counter segment 259. The CEP iput of the third counter segment 267 is connected to the CP input of the second counter segment 265 as well as to the CP input of the first counter segment 259. The CEP input of the third counter segment 267 is connected to the output of a sixth NAND gate 275. The output from NAND gate 275 also is connected to an input to a seventh NAND gate 277. The TC output of the third counter segment 267 is connected to an input of the sixth NAND gate 275 as well as to inputs to a eighth NAND gate 279.

Eighth NAND gate 279 has its other input connected to the $\bar{Q}$ output of a first J-K flip flop 281; this $\bar{Q}$ output to flip flop 281 also being connected to the CET terminal of the third counter segment 267 and the K input of the flip flop 261. The output of the second NAND gate 61 is connected to the SET input of this flIp flop 281, while the J input of this first flip flop 281 is connected to the output of the eighth NAND gate 279. A second J-K flip flop 283 has its $\bar{Q}$ output connected to a second input to the seventh NAND gate 277 as well as feedback to its K and J inputs. The Q output of this second flip flop 283 is connected to the CLOCK input of the first flip flop 281 as well as to the CP terminals of the first, second and third counter segments 259, 265 and 267.

The output of the seventh NAND gate 277 is connected in series through a 270 Ohm resistor 285 to the $\overline{PE_2}$ input of a prescaler component 287. $\overline{PE_2}$ terminal of the prescaler component 287 is connected also in common to a 240 Ohm resister 289 in series with a 0.001 microfarad capacitor 291 to ground, the resister 289, capacitor 291 interconnection being at the plus five volts supply. A 100 Ohm resister 293 is connected between the resister 289, capacitor 291 interconnection and the emitters of a first and second PNP transistors 295 and 297, respectively. The base of the transistor 295 is connected to the $\bar{Q}$ output of the prescaler component 287 while the base of the other transistor 297 is connected to the Q output of this prescaler 287. The collector of the second transistor 297 is tied to ground and to the collector of the first transistor 295 through a 330 Ohm resister 299. The collector or this first transistor is also connected to the CLOCK input of the second J-K flip flop 283.

The RESET input to the second J-K flip flop 283 is connected to ground through a 0.001 microfarad capacitor 401 and to the CP₂ terminal of the prescaler component 287 through a 100 Ohm resister 403. Connected across the resister 403 is the series connection of a 330 Ohm resistor 405 and a 0.001 microfarad capacitor 407. The common point between the resister 405 and the capacitor 407 is connected to ground.

RF feedback signal 303 is tied to the CP₂ input of this prescaler component 287 through a 43 picofarad capacitor 409. The RESET input to the second J-K flip flop 283 is alsso connected to the MR terminal of the first, second and third counter segments 259, 265, and 267 through a 1K Ohm resistor 411.

Multiplex control signal 228 has the common point between its associated resisters 231 and 235 connected througha 33K Ohm resister 413 to activate an analog quad switch 415 having four distinct switches therein: 415A, 415B, 415C and 415D; and wherein the resister 413 is connected to switches 415A, 415C, and 415D.

The common point between the resisters 231 and 235 is also connected through a 47K Ohm resister 417 to a 1K Ohm resister 419 connected to the collector of a third transistor 421 (NPN transistor). The cmmon point between the resister 417 and the resister 419 is also connected through a 1K Ohm resister 423 to the collector of a fourth transistor 425 (NPN transistor), and through a 3.3K Ohm resister 427 to activate the switch 415B. The switches 415A, 415B, 415C and 415D are a double pole, double throw switches. One pole of the switch 415C is connected to the activation side of the switch 415B while the other pole of the switch 415C is connected in common with one pole of the switch 415D to ground. The other pole of the switch 415D is connected through a 0.022 microfarad capacitor 429 to provide the control voltage 213 to the VCO 123. Connected in parallel with the VCO control voltage 213 connection from the capacitor 429 is a 1K Ohm resister 431 which is also tied to one pole of the switch 415A and one pole of the switch 415B and the collector of the fourth transistor 425.

The common point of the resisters 419, 423, and 427 is connected through a 0.1 microfarad capacitor 433 connected in parallel with a 22 microfarad capacitor 435 to ground.

A 3.2MHz crystal 435 is connected on one side to a variable capacitor 439 which capacitor 439, is variable between 9 and 35 picofarads. The other side of this capacitor 439 is connected to an input of a first amplifier 441. The input to the amplifier 441 is also connected through a 100 picofarad capacitor 443 to ground. The output of this first amplifier 441 is connected to the input of a second amplifier 445. Amplifier 445 has its output connected to the other side of the 3.2MHz crystal 437. The output of the first amplifier 441 is also fedback to its own input through a 1.2K Ohm resister 447. The output of the second amplifier 445 is also connected through a 75 picofarad capacitor 449 to ground.

A buffer amplifier 451 has its input connected to the output of the first amplifier 441 and its negative control terminal connected to ground. The output of this buffer amplifier 451 is connected to its positive control terminal through a 2.7K Ohm resistance 453. The positive control terminal of the buffer amplifier 451 is connected to the negative control terminal of this amplifier via a 0.1 microfarad capacitor 455. The output of the buffer amplifier 451 is connected to the CLOCK input of a divide-by-64 counter 457. Counter 457 has its RESET input connected to ground and its output connected through a 200 picofarad capacitor 459 to the input of a third amplifier 461. The input of the amplifier 461 is also connected through a 1.5K Ohm resister 463 to ground.

The output of the amplifier 461 is connected to the R input of a phase detector 465. Phase detector 465 has its output connected through the series connection of a first 1.5K Ohm resister 467 and a second 1.5K Ohm resister 469 to the base of the third transistor 421. The common point between the resisters 467 and 469 is connected through a 0.1 microfarad capacitor 471 to ground. The emitter of the third transistor 421 is connected to the base of the fourth transistor 425 and is connected through a 1K Ohm resister 473 to the emitter of the fourth transistor 425. This fourth transistor 425 has its emitter tied directly to ground.

The base of the third transistor 423 is connected through the series connection of a 0.047 microfarad capacitor 475 and a 3.3 microfarad capacitor 477 to the other pole of the switch 415B. The base of this third transistor 421 is also connected to the other pole of the switch 415A through the series connection of a 1.5K Ohm resister 479 and a 3.3 microfarad capacitor 481. The common connection point between the capacitors 475 and 477 and the resistor 479 and the capacitor 481 being connected in common.

The V input to the phase detector 465 is connected to the overflow pin 11 of the first counter segment 259. The plus control pin of the buffer amplifier 451 is also connected to ground through the parallel connection of a 0.01 microfarad capacitor 483 and a 100 microfarad capacitor 485.

Two Tables, I and II, shown below, are truth tables for the PROMs 229 and 241. The first Table I is directed to the programming of the megahertz PROM 229 for localizer operation and shows the output of this PROM 229 for various inputs. The second Table II is directed to the programming of the kilohertz PROM 241 and shows the various outputs of this PROM 241 for the various inputs.

The synthesizer of this invention provides a frequency in VOR or LOC operation at 17 MHz below the channel frequency since the receiver IF is 17 MHz. However, in GS operation, the frequency required is related to the selected LOC frequency by a more complex relationship as presented by Table III. In addition to providing the RF drive to the receiver mixer 105, the synthesizer is also capable of providing a 50 KHz signal to drive the multiplex control component 125. This 50 KHz signal is picked off at the Q output of counter 457.

Some of the operating features of the circuit and some of the functional component blocks within the circuit are as follows: the frequency select code converter 201 converts the two out of five ARINC switching codes (megahertz and kilohertz) from the switches 215 and 217 and the LOC/GS command, to the proper divide-by-N counter codes. In addition, the input circuits provide filtering and buffering for the input programming lines.

The input lines from the switches 215 and 217 are isolated by the diodes 219 located normally outside the synthesizer 121 shield. Good RF isolation is provided on each line by feed-through capacitors 223.

Frequency select code converter 201 includes PROM 229, PROM, 241, exclusive ORs 229 and 239, 245 and 255, and inverter/drivers 225. The inverter/drivers 225 provide input line isolation and good DC noise immunity. Code converting is performed primarily by PROMs 229 and 241 and the exclusive ORs 227, 239, 245 and 255.

The reference oscillator 209 includes a 3.2MHz crystal controlled oscillator 437, amplifiers 441 and 445, a buffer amplifier 451 driven thereby and a divide-by-64 counter 457 connected to the output of the buffer 451. Amplifier 461 on the output of counter 257 forms a pulse shaper buffer for the 50KHz pulse produced by the counter 457. The basic oscillator 209 contains two inverter amplifiers 441 and 445 connected in series. An in-phase feedback through a variable capacitor 439 and a crystal 437 sustains oscillation at the crystal frequency. The variability of the capacitor 439 permits a small adjustment of oscillator frequency.

The PROM 229 and 241 are integrated circuits which are sealed programmable read-only memories. As a memory, each PROM is organized with five input adjust lines, $A_0$ through $A_4$ and eight output lines, $B_0$ through $B_7$. This results in the ability to permanently store any required eight bit code in any of the 32 memory adjustments of each PROM. The programming codes have been shown in Tables I and II as discussed above. Note that some of the output lines of each PROM are connected back to selected inputs through exclusive OR gates 227, 239, 245 and 255. This enables all the codes for the 160 VOR navigational channels, 40 localizer channels and the 40 glide slope channels normally required of the navigational unit to be stored in the two 32×8 PROMs 229 and 241.

The above configuration allows pairing of LOC and GS frequencies by alternately switching the multiplex control signal 228 from high to low. This changes the synthesizer programming code from localizer to glide slope and results in an alternating DC control voltage from the synthesizer loop filter 211 output.

The divide-by-"N" programmable counter 203 is implemented via the first, second and third counter segments 259, 265, 267 and the first and second J-K flip flops 281 and 283 and the prescaler 287. This counter forms a variable frequency counter that divides by a ratio of 1820:1 through 2120:1 depending upon which channel is selected from the control switches 215 and 217. The first and second counter segments 259 and 265 are connected to each other to form an eight bit counter, which increments by one bit each time it is clocked by the rising edge of an incoming pulse. There counters 259 and 265 count up until they reach a binary count of 1111001 (decimal 159); the output of the fourth NAND gate 269 then goes "low", placing a logic "0" at the PE input to the first and second counter segments 259 and 265. When this occurs, the counters 259 and 265 are loaded (after waiting one clock period) to whatever number appears on the load input (input $P_0$, $P_1$, $P_2$, $P_3$) at the time of the next clock transision.

Thus, megahertz counters 259 and 265 reload after every group of pulses equal in number to one pulse plus 159 minus the number that is being loaded. By using the load pulses or the counter 259 pin 11 as the output, an output frequency of "F" divided by (1+159−N) is obtained. Therefore, megahertz counters 259 and 265 as a group, divide by (160−N); "N" being the number preset.

The CLOCK frequency for these counters 259 and 265 is obtained from the Q output of the second J-K flip flop 283. Flip flop 283 is a divide-by-2 counter, which in turn is clocked by the output frequency of prescaler 287. The prescaler 287 is a variable-modulated frequency divider, which divides the VCO 123 input frequency (feedback signal 303) by a factor of 10:1 or 11:1, depending upon whether the signal receives from the seventh NAND gate 277 is "high" or "low" respectively.

The $\overline{Q}$ output from the second J-K flip flop 283 is fedback to the prescaler 287 through this seventh NAND gate 277 to form a divide 20/21 prescaler. Should this divide 20/21 prescaler be connected to always divide by 20, the overall divide ratio of the divide "N" counter would be 20 (160−N). However, the divide ratio of the divide 20/21 prescaler is controlled by the operation of the first J-K flip flop 281 and the third counter segment 267 to be loaded with a number which can be any number from 0 to 19.

The kilohertz counter includes the first J-K flip flop 281 and the third counter segment 267 with flip flop 281 being preset by the switch 215 "Y" channel bit and the counter segment 267 programmed by the kilohertz PROM 241 output. If a channel selected which does not preset the first J-K flip flop 281 and the third counter segment 237 to their terminal counter (01001) decoded by NAND gate 275, the divide by 20/21 prescaler 287 is set to the divide by 21 mode; caused by the "high" at the output of NAND gate 277. Therefore, for every 21st input to prescaler 287, an output pulse appears at the Q output of the second J-K flip flop 283 which clocks the first J-K flip flop 281, the first counter segment 259, the second counter segment 265 and the third counter segment 267.

This process then continues until the third counter segment 267 and the first flip flop 281 reaches their terminal count, causing the output of the third NAND gate 263 to go "low". This "low" at the output of the third NAND gate 263 stops the third counter segment 267 and the first J-K flip flop 281 from counting further and also forces the output of the seventh NAND gate 277 to go "high". The "high" at the output of this seventh NAND gate 277 switches the divide by 20/21 prescaler 287 to the divide by 20 mode until the megahertz count reaches 159 to reload all the counters.

Thus the third counter segment 267 and the first J-K flip flop 281 cause a number of extra VCO 123 input cycles (equal to 19−N) to be consumed by using an extra input VCO 123 cycle for each output clock pulse at the second J-K flip flop 283 Q output. This increases the divide ratio of the entire counter by 19−N which makes the overall ratio 20 (160−$N_2$) plus (19−$N_1$).

The phase detector 465 compares the 50KHz crystal reference signal with the 50KHz from the divide-by-N counter and produces an error signal when a difference in frequency or phase exists.

A difference in frequency produces pulses from the output of the phase detector 465. Loop filter 211 of FIG. 3 is implemented by the analog quad switch 415 and its associated drive and control circuitry. This loop filter 211 provides dynamic loop stability and filters the phase detector 465 output pulses into a DC control voltage 213 output to the VCO 123. This DC control voltage 213 serves as a correction voltage to the VCO 123 and varies the VCO frequency until the 50Hz reference frequency and the 50Hz variable frequency from the divide-by-"N" counter are locked in phase. The filter 211 operation is controlled by the analog switch 415.

TABLE I

PROGRAMMING OF KHz PROM 229 FOR VOR/LOC OPERATION

| FREQ (MHz) | ARINC (J803 PIN NO.) 15 18 20 19 A B C D | MPX CON'1 228 | PROM LOGIC LEVELS PROM INPUT PIN NO. 10 11 12 13 14 | PROM OUTPUT PIN NO. B- 1 2 3 4 5 6 7 9 |
|---|---|---|---|---|
| 108 | 0 1 1 0 | 1 | 0 1 0 1 1 | 0 0 1 1 0 1 1 0 |
| 109 | 0 1 1 1 | 1 | 0 0 0 1 1 | 0 0 0 1 0 1 1 0 |
| 110 | 1 0 1 1 | 1 | 0 0 1 0 1 | 1 1 1 0 0 1 1 0 |
| 111 | 0 0 1 1 | 1 | 0 0 1 1 1 | 1 1 0 0 0 1 1 0 |
| 112 | 0 1 0 1 | 1 | 0 0 0 1 0 | 1 0 1 0 0 1 0 0 |
| 113 | 1 0 0 1 | 0 | 0 0 1 0 0 | 1 0 0 0 0 1 0 0 |
| 114 | 1 0 1 0 | 1 | 0 1 1 0 1 | 0 1 1 0 0 1 0 0 |
| 115 | 1 1 0 0 | 1 | 0 1 0 0 0 | 0 1 0 0 0 1 0 0 |
| 116 | 1 1 0 1 | 1 | 0 0 0 0 0 | 0 0 1 0 0 1 0 0 |
| 117 | 1 1 1 0 | 1 | 0 1 0 0 1 | 0 0 0 0 0 1 0 0 |

PROGRAMMING OF MHz PROM 229 FOR GS OPERATION

TABLE I-continued

PROGRAMMING OF KHz PROM 229 FOR VOR/LOC OPERATION

| FREQ (MHz) | NECTOR PINS 15 18 20 19 9 | INPUT PINS 10 11 12 13 14 | OUTPUT PINS 1 2 3 4 5 6 7 9 |
|---|---|---|---|
| 108.1 | 0 1 1 0 0 | 1 1 0 1 1 | 1 0 1 0 1 0 1 0 |
| 108.3 | 0 1 1 0 0 | 1 1 0 1 1 | 1 0 1 0 1 0 1 0 |
| 108.5 | 0 1 1 0 0 | 1 1 0 1 0 | 1 1 0 0 1 0 1 0 |
| 108.7 | 0 1 1 0 0 | 1 1 0 1 0 | 1 1 0 0 1 0 1 0 |
| 108.9 | 0 1 1 0 0 | 1 1 0 1 0 | 1 1 0 0 1 0 1 0 |
| 109.1 | 0 1 1 1 0 | 1 0 0 1 1 | 1 1 0 0 0 0 1 1 |
| 109.3 | 0 1 1 1 0 | 1 0 0 1 1 | 1 1 0 0 0 0 1 1 |
| 109.5 | 0 1 1 1 0 | 1 0 0 1 0 | 1 0 1 0 0 0 1 1 |
| 109.7 | 0 1 1 1 0 | 1 0 0 1 0 | 1 0 1 0 0 0 1 1 |
| 109.9 | 0 1 1 1 0 | 1 0 0 1 0 | 1 0 1 0 0 0 1 1 |
| 110.1 | 1 0 1 1 0 | 1 0 1 0 1 | 1 0 1 0 0 0 1 1 |
| 110.3 | 1 0 1 1 0 | 1 0 1 0 1 | 1 0 1 0 0 0 1 1 |
| 110.5 | 1 0 1 1 0 | 1 0 1 0 0 | 1 1 0 0 0 0 1 1 |
| 110.7 | 1 0 1 1 0 | 1 0 1 0 0 | 1 1 0 0 0 0 1 1 |
| 110.9 | 1 0 1 1 0 | 1 0 1 0 0 | 1 1 0 0 0 0 1 1 |
| 111.1 | 0 0 1 1 0 | 1 0 1 1 1 | 1 1 0 0 1 0 1 0 |
| 111.3 | 0 0 1 1 0 | 1 1 1 1 0 | 1 0 1 0 1 0 1 1 |
| 111.5 | 0 0 1 1 0 | 1 0 1 1 0 | 1 0 1 0 1 0 1 0 |
| 111.7 | 0 0 1 1 0 | 1 0 1 1 0 | 1 0 1 0 1 0 1 0 |
| 111.9 | 0 0 1 1 0 | 1 1 1 1 1 | 1 1 0 0 1 0 1 1 |

TABLE II

PROGRAMMING OF KHz PROM 241 FOR VOR/LOC OPERATION

| FREQ (MHz) | ARINC (J803 PIN NO.) 16 14 17 8 12 B C D E Y | PROM LOGIC LEVELS PROM INPUT PIN NO. 10 11 12 13 14 | PROM OUTPUT PIN NO. B- 1 2 3 4 5 6 7 9 |
|---|---|---|---|
| .0 | 0 1 1 0 0 | 1 0 0 0 0 | 0 0 0 1 1 1 1 1 |
| .05 | 0 1 1 0 1 | 1 0 0 0 0 | 0 0 0 1 1 1 1 1 |
| .10 | 0 1 1 1 0 | 1 0 0 1 1 | 1 0 0 0 1 1 1 1 |
| .15 | 0 0 1 1 0 | 1 0 0 1 1 | 1 0 0 0 1 1 1 1 |
| .20 | 1 0 1 1 0 | 0 1 0 1 1 | 0 1 1 1 0 1 1 1 |
| .25 | 1 0 1 1 1 | 0 1 0 1 1 | 0 1 1 1 0 1 1 1 |
| .30 | 0 0 1 1 0 | 1 1 0 0 0 | 1 1 1 0 0 1 1 0 |
| .35 | 0 0 1 1 1 | 1 1 0 0 0 | 1 1 1 0 0 1 1 0 |
| .40 | 0 1 0 1 0 | 1 0 1 0 0 | 0 1 0 1 0 1 1 0 |
| .45 | 0 1 0 1 1 | 1 0 1 0 0 | 0 1 0 1 0 1 1 0 |
| .50 | 1 0 0 1 0 | 0 1 1 0 0 | 1 1 0 0 0 1 1 0 |
| .55 | 1 0 0 1 1 | 0 1 1 0 0 | 1 1 0 0 0 1 1 0 |
| .60 | 1 0 1 0 0 | 0 1 0 0 0 | 0 0 1 1 0 1 1 1 |
| .65 | 1 0 1 0 1 | 0 1 0 0 0 | 0 0 1 1 0 1 1 1 |
| .70 | 1 1 0 0 0 | 0 0 1 0 0 | 1 0 1 0 0 1 1 1 |
| .75 | 1 1 0 1 1 | 0 0 1 0 0 | 1 0 1 0 0 1 1 1 |
| .80 | 1 1 0 1 0 | 0 0 1 1 1 | 0 0 0 1 0 1 1 1 |
| .85 | 1 1 0 1 1 | 0 0 1 1 1 | 0 0 0 1 0 1 1 1 |
| .90 | 1 1 1 0 0 | 0 0 0 0 0 | 1 0 0 0 0 1 1 1 |
| .95 | 1 1 1 0 1 | 0 0 0 0 0 | 1 0 0 0 0 1 1 1 |

| CHANNEL FREQ (MHz) | INPUT CONNECTOR PINS 15 18 20 19 | PROM INPUT PINS 10 11 12 13 14 | PROM OUTPUT PINS 1 2 3 4 5 6 7 9 |
|---|---|---|---|
| 108.1 | 0 1 1 1 | 1 0 0 1 0 | 1 0 0 1 0 1 1 1 |
| 108.3 | 0 0 1 1 | 1 1 0 0 1 | 1 0 1 1 0 1 0 0 |
| 108.5 | 1 0 0 1 | 0 1 1 0 1 | 1 1 1 1 0 0 1 0 |
| 108.7 | 1 1 0 0 | 0 0 1 0 1 | 1 1 0 1 0 0 1 1 |
| 108.9 | 1 1 1 0 | 0 0 0 0 1 | 1 0 0 1 1 0 0 1 |
| 109.1 | 0 1 1 1 | 1 0 0 0 1 | 1 0 1 0 0 1 1 1 |
| 109.3 | 0 0 1 1 | 1 1 0 1 0 | 1 0 0 0 0 1 1 0 |
| 109.5 | 1 0 0 1 | 0 1 1 1 0 | 1 0 0 0 1 0 1 0 |
| 109.7 | 1 1 0 0 | 0 0 1 1 0 | 1 1 1 0 0 0 1 1 |
| 109.9 | 1 1 1 0 | 0 0 0 1 0 | 1 1 0 0 0 0 1 1 |
| 110.1 | 0 1 1 1 | 1 0 0 0 1 | 1 0 1 0 0 1 1 1 |
| 110.3 | 0 0 1 1 | 1 1 0 1 0 | 1 0 0 0 0 1 1 0 |
| 110.5 | 1 0 0 1 | 0 1 1 1 0 | 1 0 0 0 1 0 1 0 |
| 110.7 | 1 1 0 0 | 0 0 1 1 0 | 1 1 1 0 0 0 1 1 |
| 110.9 | 1 1 1 0 | 0 0 0 1 0 | 1 1 0 0 0 0 1 1 |
| 111.1 | 0 1 1 1 | 1 0 0 1 0 | 1 0 0 1 0 1 1 1 |
| 111.3 | 0 0 1 1 | 1 1 0 1 1 | 1 0 0 1 1 0 0 0 |
| 111.5 | 1 0 0 1 | 0 1 1 0 1 | 1 1 1 1 0 0 1 0 |
| 111.7 | 1 1 0 0 | 0 0 1 0 1 | 1 1 0 1 0 0 1 1 |
| 111.9 | 1 1 1 0 | 0 0 0 1 1 | 1 0 1 1 0 1 0 1 |

Table III

| (NAV) LOC RF | (NAV) LOC VCO | G S RF | G S LO | G S VCO |
|---|---|---|---|---|
| 108.10 | 91.10 | 334.70 | 317.70 | 105.90 |
| 108.15 | 91.15 | 334.55 | 317.55 | 105.85 |
| 108.30 | 91.30 | 334.10 | 317.10 | 105.70 |
| 108.35 | 91.35 | 333.95 | 316.95 | 105.65 |
| 108.50 | 91.50 | 329.90 | 312.90 | 104.30 |
| 108.55 | 91.55 | 329.75 | 312.75 | 104.25 |
| 108.70 | 91.70 | 330.50 | 313.50 | 104.50 |
| 108.75 | 91.75 | 330.35 | 313.35 | 104.45 |
| 108.90 | 91.90 | 329.30 | 312.30 | 104.10 |
| 108.95 | 91.95 | 329.15 | 312.15 | 104.05 |
| 109.10 | 92.10 | 331.40 | 314.40 | 104.80 |
| 109.15 | 92.15 | 331.25 | 314.25 | 104.75 |
| 109.30 | 92.30 | 332.00 | 315.00 | 105.00 |
| 109.35 | 92.35 | 331.85 | 314.85 | 104.95 |
| 109.50 | 92.50 | 332.60 | 315.60 | 105.20 |
| 109.55 | 92.55 | 332.45 | 314.45 | 105.15 |
| 109.70 | 92.70 | 333.20 | 316.20 | 105.40 |
| 109.75 | 92.75 | 333.05 | 316.05 | 105.35 |
| 109.90 | 92.90 | 333.80 | 316.80 | 105.60 |
| 109.95 | 92.95 | 333.65 | 316.65 | 105.55 |
| 110.10 | 93.10 | 334.40 | 317.40 | 105.80 |
| 110.15 | 93.15 | 334.25 | 317.25 | 105.75 |
| 110.30 | 93.30 | 335.00 | 318.00 | 106.00 |
| 110.35 | 93.35 | 334.85 | 317.85 | 105.95 |
| 110.50 | 93.50 | 329.60 | 312.60 | 104.20 |
| 110.55 | 93.55 | 329.45 | 312.45 | 104.15 |
| 110.70 | 93.70 | 330.20 | 313.20 | 104.40 |
| 110.75 | 93.75 | 330.05 | 313.05 | 104.35 |
| 110.90 | 93.90 | 330.80 | 313.80 | 104.60 |
| 110.95 | 93.95 | 330.65 | 313.65 | 104.55 |
| 111.10 | 94.10 | 331.70 | 314.70 | 104.90 |
| 111.15 | 94.15 | 331.55 | 314.55 | 104.85 |
| 111.30 | 94.30 | 332.30 | 315.30 | 105.10 |
| 111.35 | 94.35 | 332.15 | 315.15 | 105.05 |
| 111.50 | 94.50 | 332.90 | 315.90 | 105.30 |
| 111.55 | 94.55 | 332.75 | 315.75 | 105.25 |
| 111.70 | 94.70 | 333.50 | 316.50 | 105.50 |
| 111.75 | 94.75 | 333.35 | 316.35 | 105.45 |
| 111.90 | 94.90 | 331.10 | 314.10 | 104.70 |
| 111.95 | 94.95 | 330.95 | 313.95 | 104.65 |

The apparatus as described herein is directed to the preferred embodiment of the invention, however, many changes can be made in this embodiment without departing from the intent and scope thereof. It is intended, therefore, that this disclosure be considered as illustrative and not as limiting or all encompassing.

What is claimed:

1. In a navigational receiver apparatus having an operator select, an RF amplifier and mixer front end and a voltage controlled oscillator for supplying mixing frequencies thereto wherein a plurality of signals are capable of being alternatively received, as selected by an operator, requiring a plurality of mixing frequencies alternately developed, an improved frequency synthesizer apparatus for supplying a plurality of control voltages to said voltage controlled oscillator, comprising:
 means for receiving instructions representative of said plurality of signals alternately received, said receiving means being connected to said operator select;
 means, responsive to said receiving means, for developing a plurality of signals, alternately, as a function of said instructions received;
 means, responsive to said signal developing means, for providing a plurality of control voltages, alternately, to said voltage controlled oscillator; and
 means for providing timing control, the operation of said receiving means, said signal means and said control voltage providing means being controlled from said timing control means.

2. The apparatus of claim 1 wherein said timing control means includes a reference oscillator; wherein said receiving means is capable of receiving digital instruction words; and wherein said signal means includes digital components.

3. The apparatus of claim 2 wherein said alternate operation of said receiving means, said signal means and said control voltage means providing means operate in a time-shared multiplexed mode.

4. The apparatus of claim 3 wherein said control voltage means includes memory means for storing historical information of that voltage required for each frequency desired.

5. The apparatus of claim 4 wherein said receiving means, said signal means and said control voltage providing means switch operation mode simultaneously.

6. The apparatus of claim 4 wherein said receiving means includes at least one read only memory associated with said operator select; and a divide-by-k component being connected between said reference oscillator and said read only memory.

7. The apparatus of claim 6 wherein said signal means includes a divide-by-N counter connected to said read only memory and said reference oscillator.

8. The apparatus of claim 7 wherein said control voltage means also includes:
 a phase detector, being connected to said divide-by-N counter and said reference oscillator; and
 a loop filter, being connected to said phase detector and to said voltage controlled oscillator on its output.

9. The apparatus of claim 8 wherein said control voltage means memory means includes a plurality of storage capacitors associated with said loop filter.

10. The apparatus of claim 9 also including means for holding historical voltages read on said storage capacitors for each frequency.

11. A navigational receiver having an RF amplifier and mixer front end and a voltage controlled oscillator for supplying a mixing frequency to said RF mixer, said voltage controlled oscillator being driven by a frequency synthesizer which in turn is controlled by a channel select component, the improvement comprising:
 means for providing a digital instruction word representative of a channel selected, said digital word providing means being an associated part of said channel select component;
 digital means for supplying a specific control voltage to said voltage controlled oscillator as a function of a specific digital instruction word received from said digital instruction word means, said digital control voltage supply means being an associated part of said frequency synthesizer, including a code converter and buffers component connected to said digital instruction word means, a divide-by-N counter connected to the output of said decoder and buffers component and receiving a feedback L.O. frequency signal from said voltage controlled oscillator, a phase detector connected to the output of said divide-by-N counter, and a loop filter connected to receive its input from said phase detector and to supply a control voltage to said voltage controlled oscillator; and
 a reference oscillator for supplying clock pulses to said phase detector; and a frequency scaling component connected between said reference oscillator output and said code converter and buffers.

12. The receiver of claim 11 also including memory storage components associated with said loop filter.

13. The receiver of claim 12 wherein said code converter and buffers component includes a read only memory connected to said channel select component, said memory providing said digital instruction word representative of a channel selected; and said read only memory provides a new said digital instruction word as a function of the operating state of said frequency scaling component.

* * * * *

UNITED STATES PATENT OFFICE
CERTIFICATE OF CORRECTION

Patent No. 4,184,158          Dated January 15, 1980

Inventor(s) Frank Patterson Smith, 2nd

It is certified that error appears in the above-identified patent and that said Letters Patent are hereby corrected as shown below:

Column 1, line 11 "nagigate" should be --navigate--

Column 1, line 44 "chemical" should be --channel--

Column 4, line 44 "microseConds should be --microseconds--

Column 5, line 3 "kiloHertz" should be --kilohertz--

Column 5, line 23 "idEntical" should be --identical--

Column 5, line 34 "224" should be --225--

Column 5, line 40 "inveRTEr" should be --inverter--

Column 5, line 55 "seconD" should be --second--

Column 6, line 55 "coMmon" should be --common--

Column 7, line 8 "iput" should be --input--

Column 7, line 23 "61" should be --261--

Column 7, line 23 "flIp" should be --flip--

Column 7, line 63 "alsso" should be --also--

Column 7, line 68 "througha" should be --through a--

Column 8, line 7 "cmmon" should be --common--

UNITED STATES PATENT OFFICE

CERTIFICATE OF CORRECTION

Patent No. 4,184,158　　　　　　　Dated January 15, 1980

Inventor(s) Frank Patterson Smith, 2nd

It is certified that error appears in the above-identified patent and that said Letters Patent are hereby corrected as shown below:

Column 11, line 51 "KHz" should be --MHz--

Column 12, line 3 "KHz" should be --MHz--

Column 13, line 17 "314.45" should be --315.45--

Column 13, line 65 after "providing" insert --operational--

Signed and Sealed this

Twentieth Day of May 1980

[SEAL]

Attest:

SIDNEY A. DIAMOND

Attesting Officer　　Commissioner of Patents and Trademarks